United States Patent [19]
Hudson

[11] Patent Number: 5,533,555
[45] Date of Patent: Jul. 9, 1996

[54] DELIMBING APPARATUS HAVING SELECTIVE CLOSABLE GUIDE ARMS

[76] Inventor: Thomas H. Hudson, 2688 Virginia Dr., Hueytown, Ala. 35023

[21] Appl. No.: 403,298

[22] Filed: Mar. 14, 1995

Related U.S. Application Data

[63] Continuation-in-part of Ser. No. 47,912, Apr. 19, 1993, Pat. No. 5,293,914.

[51] Int. Cl.⁶ .............................. B27L 1/00; A01G 23/00
[52] U.S. Cl. ..................... 144/24.13; 60/428; 91/183; 91/446; 144/338; 144/343; 144/356; 144/4.1
[58] Field of Search ............................. 60/428; 91/178, 91/183, 446, 468, 513, 517, 536; 137/102, 137, 628; 144/2 Z, 3 D, 338, 343, 356

[56] References Cited

U.S. PATENT DOCUMENTS

| | | | |
|---|---|---|---|
| 4,114,666 | 9/1978 | Bruun | 144/2 Z |
| 4,124,047 | 11/1978 | Dressler et al. | 144/2 Z |
| 4,130,151 | 12/1978 | Ericsson | 144/2 Z |
| 4,164,246 | 8/1979 | Savage et al. | 144/2 Z |
| 4,899,794 | 2/1990 | Hamby, Jr. | 144/2 Z |
| 5,129,438 | 7/1992 | Hamilton | 144/2 Z |
| 5,293,914 | 3/1994 | Hudson | 144/2 Z |

*Primary Examiner*—W. Donald Bray
*Attorney, Agent, or Firm*—Veal & Marsh

[57] ABSTRACT

A hydraulic control circuit for uniform controlled movement of stripping and guiding arms in a tree delimbing apparatus. The piston rods of said cylinders are mechanically coupled to rotate tubular sleeve members with affixed stripping and guide arms between outward and inward positions. The stripping levers and guide arms open and close about a felled tree in a uniform manner for delimbing operations. A valve is provided for actuation to permit the guiding arms to be held in an open position, while the stripping arms are closed about a tree to accommodate a bent trunk.

13 Claims, 5 Drawing Sheets

5,533,555

DELIMBING APPARATUS HAVING SELECTIVE CLOSABLE GUIDE ARMS

This is a continuation in part of U.S. Pat. No. 5,293,914, issued Mar. 15, 1994, on application Ser. No. 07/047,912, filed Apr. 19, 1993.

FIELD OF THE INVENTION

The present invention relates to a hydraulic control circuit for a delimbing apparatus and, more particularly, to the control of the stripping and guiding arms present on such a delimbing apparatus. In even greater particularity, the present invention relates to a hydraulic control circuit which allows independent controlled movement of the stripping arms and guide arms in operation with a delimbing apparatus.

BACKGROUND OF THE INVENTION

Tree delimbing devices are generally known in the prior art of the forestry and tree harvesting industry. These delimbers typically utilize stripping arms and guide arms to facilitate the delimbing operation. A felled tree is moved longitudinally through a support frame of a delimber which supports the arms that guide and subsequently strip the outwardly extending limbs of the tree. A knuckle boom loader is normally used to grasp and move the tree through the delimbing device. When the delimbing process is completed the stripped trunks of the felled trees may be placed on a transport trailer by the knuckle boom loader.

Uniform inward and outward movement of the stripping and guide arms is required to maintain the felled tree in a centered position within the support frame of the delimber. A centered position of the felled trees is required for an efficient delimbing operation. Stripping arms may gouge the trunk of a felled tree which has not been properly centered as it is moved through the delimber, thereby impairing the forward longitudinal movement of the tree and delaying the entire delimbing process.

In the past, delimbers have utilized different means for providing uniform inward and outward movement of the stripping and guiding arms. Resilient springs were often used as a method of moving the arms inward and to maintain the arms against the trunks of the felled trees. Positive gear drives, such as those found in U.S. Pat. No. 4,749,012 issued to Hamby, have also been used to control the inward movement of the stripping and guide arms in other delimbing machines. These gears are drivingly interconnected to time mechanically the closing of one arm with another. Such gearing means adding a great deal of manufacturing expense to the delimbing apparatus. Often, hydraulically activated cylinders are used to move these stripping and guiding arms to their open position, while the resilient means control the inward movement to maintain the arms against the tree trunk when the hydraulic cylinder rods are extended. In my U.S. Pat. No. 5,293,914, I addressed a need for a controlled independent uniform operation of these stripping and guide arms to allow for efficient consistent delimbing operations. Experience in using delimbers with various types of trees has led to the realization that closure of the guide arms and stripping arms creates problems on trees with trunks that are deformed, such that the trunk binds between the guide arms and the stripping arms such that the freely pivoting delimber head is unable to follow the trunk and, therefore, improperly delimbs the tree. That is to say, it gouges the tree or it requires excessive force to pull the tree through the delimber, thereby unnecessarily stressing the loader and support structure.

SUMMARY OF THE PRESENT INVENTION

With the foregoing in mind, it is the principal object of the present invention to provide a hydraulic control circuit for a delimbing apparatus which allows independent timed control of the stripping and guiding arms, such that the arms may be selectively opened and closed in cooperative pairs.

Another object of the present invention is to provide a selective control circuit for a delimbing apparatus which can be connected to the hydraulic system of knuckle boom loader commonly used in conjunction with delimbing devices.

These and other objects of the present invention are accomplished through the use of a hydraulic control circuit which provides equal flow rates of pressurized hydraulic fluid to hydraulically activated cylinders that are operatively connected to the stripping and guiding arms. The system will also provide increased flow to cylinder which encounters the greatest resistance to keep the respective cylinders synchronized in movement. The hydraulic control circuit utilizes flow divider combiner valves in normal operation and provides a mechanical or electromechanical means for blocking the flow to the guide arm portion of the circuit as an option of the operator.

BRIEF DESCRIPTION OF THE DRAWINGS

Other objects and advantages of the present invention will become more apparent when taken in connection with the accompanying drawings in which.

DETAILED DESCRIPTION OF THE PREFERRED EMBODIMENT

Figure 1:
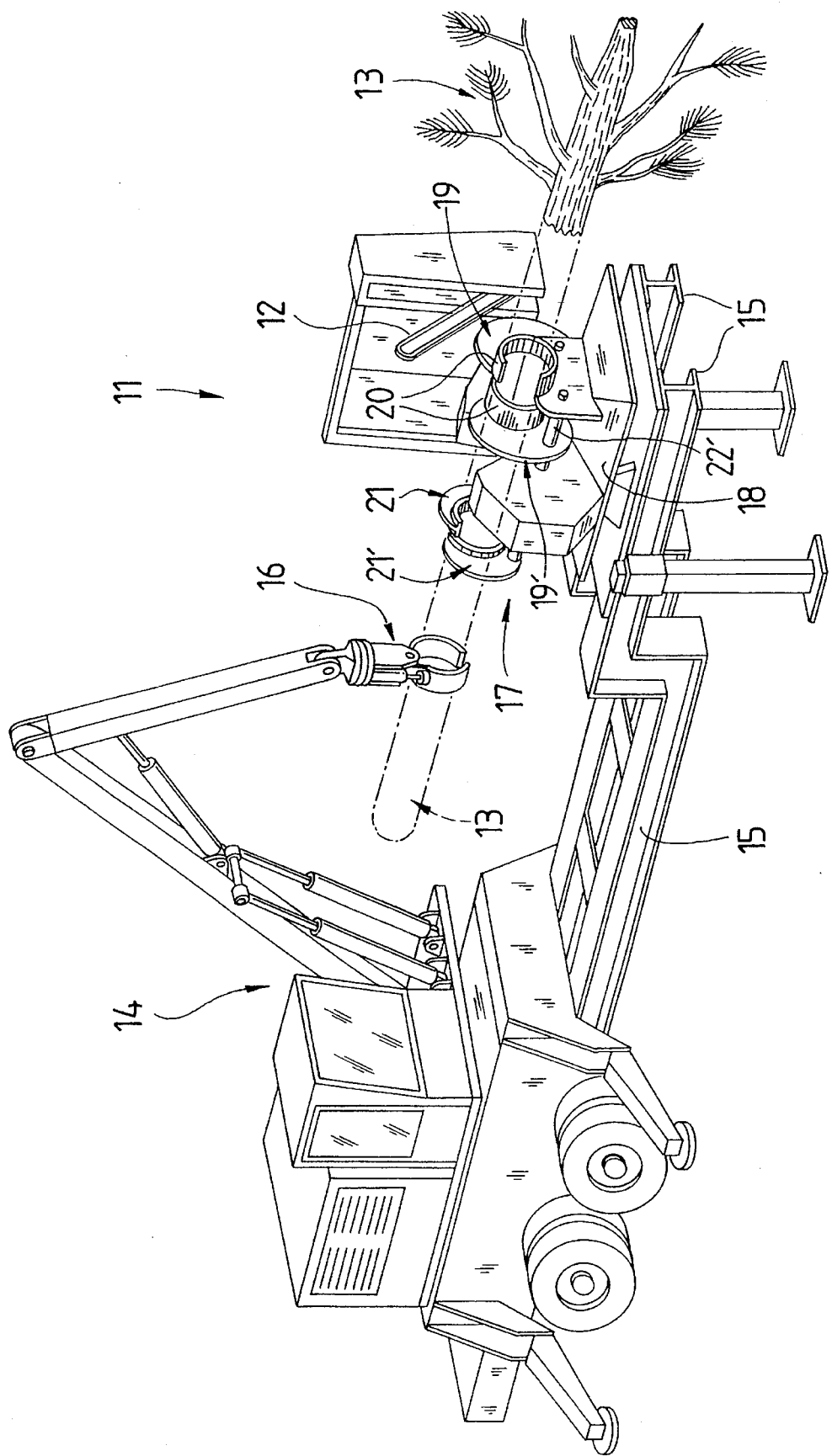
FIG. 1 is a perspective view of the delimbing apparatus in which the present invention may be employed.

As shown in FIG. 1, the preferred embodiment of the present invention is designed to be employed in a tree delimbing apparatus 11 which may utilize a reciprocating saw 12 for topping the felled trees 13 after the delimbing operation. A log skidder or loader is used to drag the felled trees 13 to an area near the delimbing apparatus 11. A knuckle boom loader 14 is connected to the tree delimber 11 via trailer frame members 15. The knuckle boom loader 14 has a grapple 16 for grasping one or more of the felled trees 13. The felled trees 13 are placed in the cutter head assembly 17 of the delimbing apparatus 11.

Figure 2:
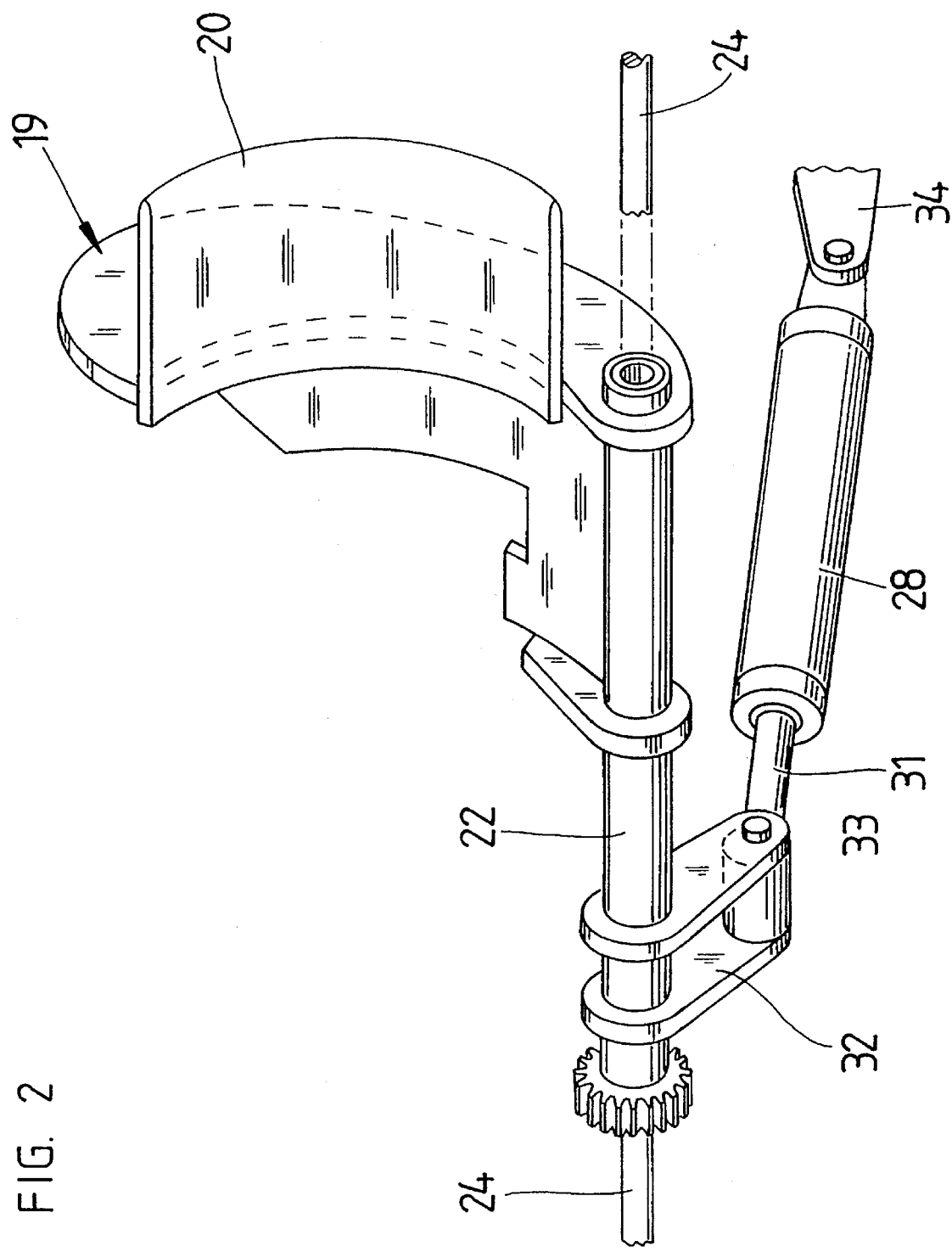
FIG. 2 is a perspective view of a stripping lever affixed to a sleeve and coupled to a hydraulic cylinder.

The cutter head assembly 17 includes a linear support frame 18 with a pair of curved stripping arms 19 and 19' pivotally mounted for movement toward and away from each other. The stripping arms 19 and 19' define a circular opening for the longitudinal movement of a tree 13 therethrough. Guide arms 21 and 21' also define a circular opening for guiding and stabilizing the movement of the tree 13. These stripping arms 19, 19' and guide arms 21 and 21' are shown in greater detail in FIGS. 2 and 3. The lower ends of the stripping arms 19, 19' and guide arms 21, 21' are affixed to a set of sleeves which rotate about a pair of shafts 23 and 24. In FIG. 2, a stripping arm 19 is shown in greater detail. A curved cutting blade 20 is affixed to stripping arm 19. The stripping arm 19 is fixed at a lower end to a tubular sleeve member 22 which rotates about shaft 24. In similar fashion, the guiding arms 21 and 21' are fixed to tubular sleeve members 25 and 25' which rotate about shafts 23 and 24, as shown in FIG. 4.

The tubular sleeve members 22, 22' and the affixed stripping arms 19, 19' are rotated to an outwardly open position by a first pair of hydraulic cylinders 28 and 28'. Cylinders 28 and 28' include a piston 30 and piston rod 31. As seen in FIG. 2, one end of piston rod 31 extends from cylinder 28 and is connected by pin 33 to a lever arm 32. This lever arm 32 is affixed to one end of a sleeve member 22. The cylinders 28, 28' are also connected at one end to support bracket 34 attached to a wall of the support frame 18. The piston rod 31 extends from and is drawn within cylinder 28, thereby forcing the coupled lever arm 32 to rotate tubular sleeve member 22 and affixed stripping arm 19 between an outward and an inward position.

Figure 3:
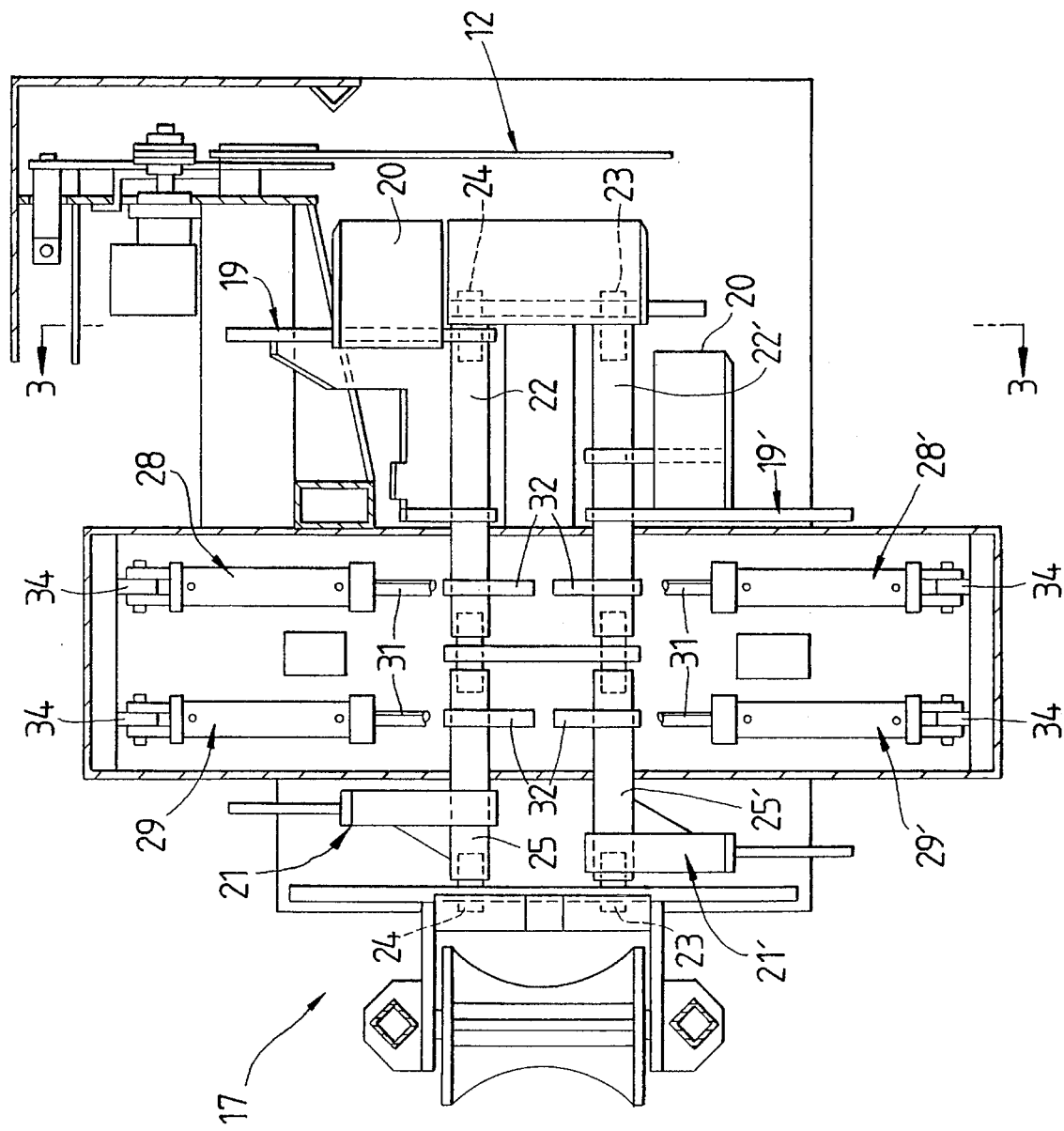
FIG. 3 is a fragmented top plan view of the support frame and associated levers.
Figure 4:
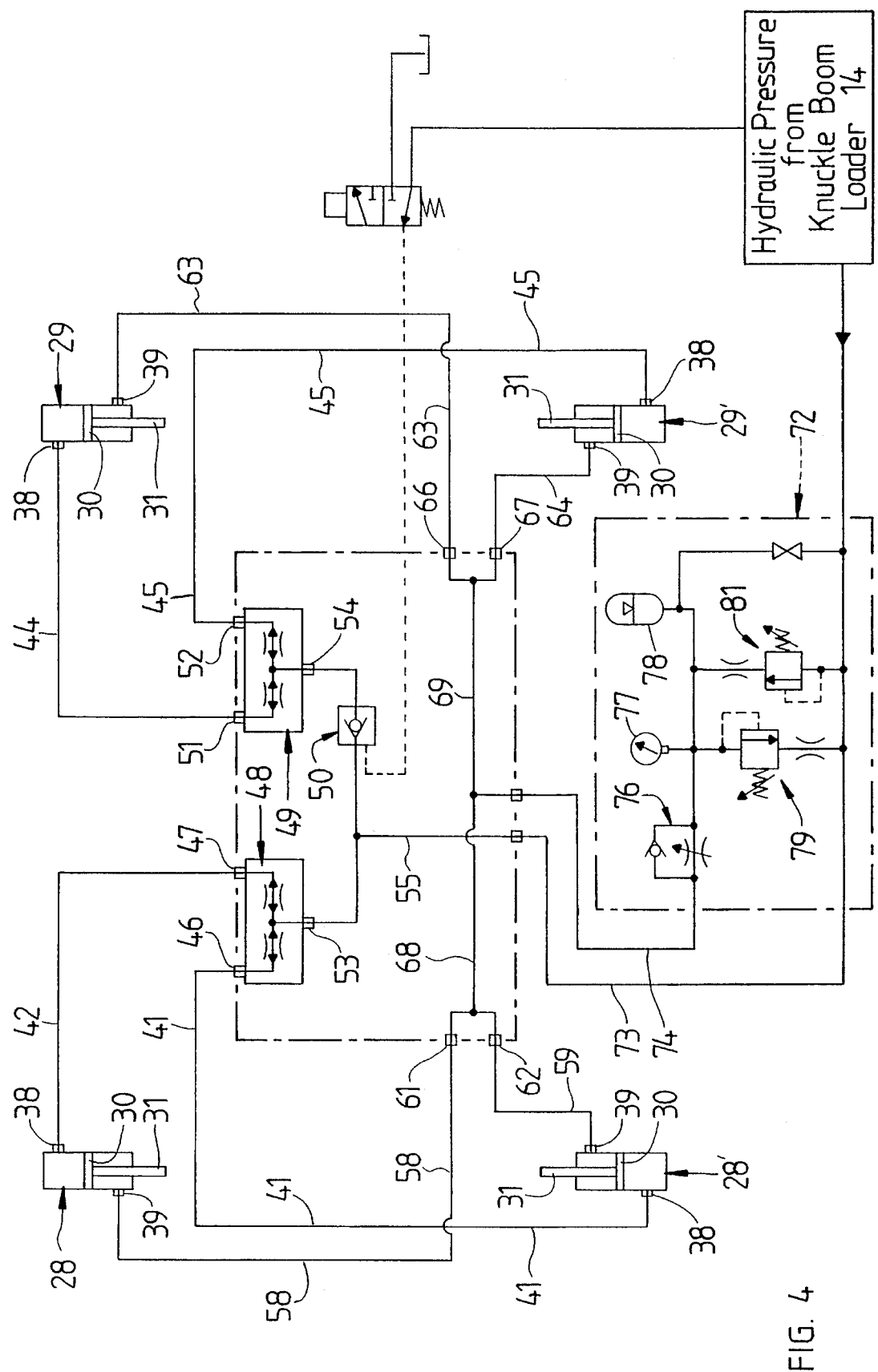
FIG. 4 is a schematic of a hydraulic circuit incorporating the principles of the present invention; and, FIG. 5 is a schematic of an alternative circuit which is electromechanically operated.

In similar fashion, a second pair of hydraulic cylinders 29 and 29' are connected to the lever arms 32 of tubular sleeve members 25 and 25.' Thus, the piston rods 31 of cylinders 29, 29' rotate the affixed guide arms 21 and 21' between outward and inward positions, as seen in FIGS. 3 and 4. When a tree having a trunk which is generally straight is encountered, both the stripping arms 19,19' and the guide arms 21,21' are closed about the trunk to facilitate the smooth operation of the delimber; however, when the trunk is not straight the guide arms 21 & 21' may need to be held in the open position to allow the head to move freely along the trunk.

These first and second sets of hydraulic cylinders 28, 28' and 29, 29' each have a blind end port 38 as well as a rod end port 39, as seen in the schematic of FIG. 4. The blind end ports 38 of cylinders 28 and 28 ' are connected by conduits 41 and 42 to a flow divider combiner valve 48. The blind end ports 38 of cylinders 29 and 29' are also connected to a flow divider combiner valve 49 through conduits 44 and 45.

Conduit 41 connects to a port 46 of the flow divider combiner valve 48, while conduit 42 connects to a port 47 of the flow divider combiner valve 48. The conduit 44 connects to port 51 of flow divider combiner valve 49, while conduit 45 connects to port 52 the same valve 49. Fluid communication through the valves 48 and ports 46 and 47 is accomplished via common form port 53. Likewise, ports 51 and 52 connect within flow divider combiner valve 49 to permit flow through common port 54, as can be seen in FIG. 4. Intermediate port 54 and the common conduit 55, I incorporate a valve 50, which is a controllable valve operable from the cab of the knuckle boom loader, such that flow therethrough may be selectively restricted. The valve may be controlled hydraulically as in FIG. 4, or electrically as in FIG. 5. The ports 53 and 54 connect to conduit 55 which further connects to port 56 of the manifold block 43.

The cylinders 28, 28', 29 and 29' all have rod end ports 39 as discussed hereinabove. Rod end port 39 of cylinder 28 is connected via conduit 58 to port 61 of manifold block 43. In a similar manner, the rod end port 39 of cylinder 28' is connected by conduit 59 to port 62. Cylinder 29 is connected by conduit 63 from the rod inlet port 39 to port 66 on the manifold block 43. Similarly, the rod end port 39 of cylinder 29' is connected by conduit 64 to port 67 of the manifold block 43. Ports 61 and 62 from cylinders 28, 28' connect to form conduit 68, while ports 66 and 67 from cylinders 29 and 29' further connect to form conduit 69. The conduits 68 and 69 connect to form a common port 71.

Figure 5:
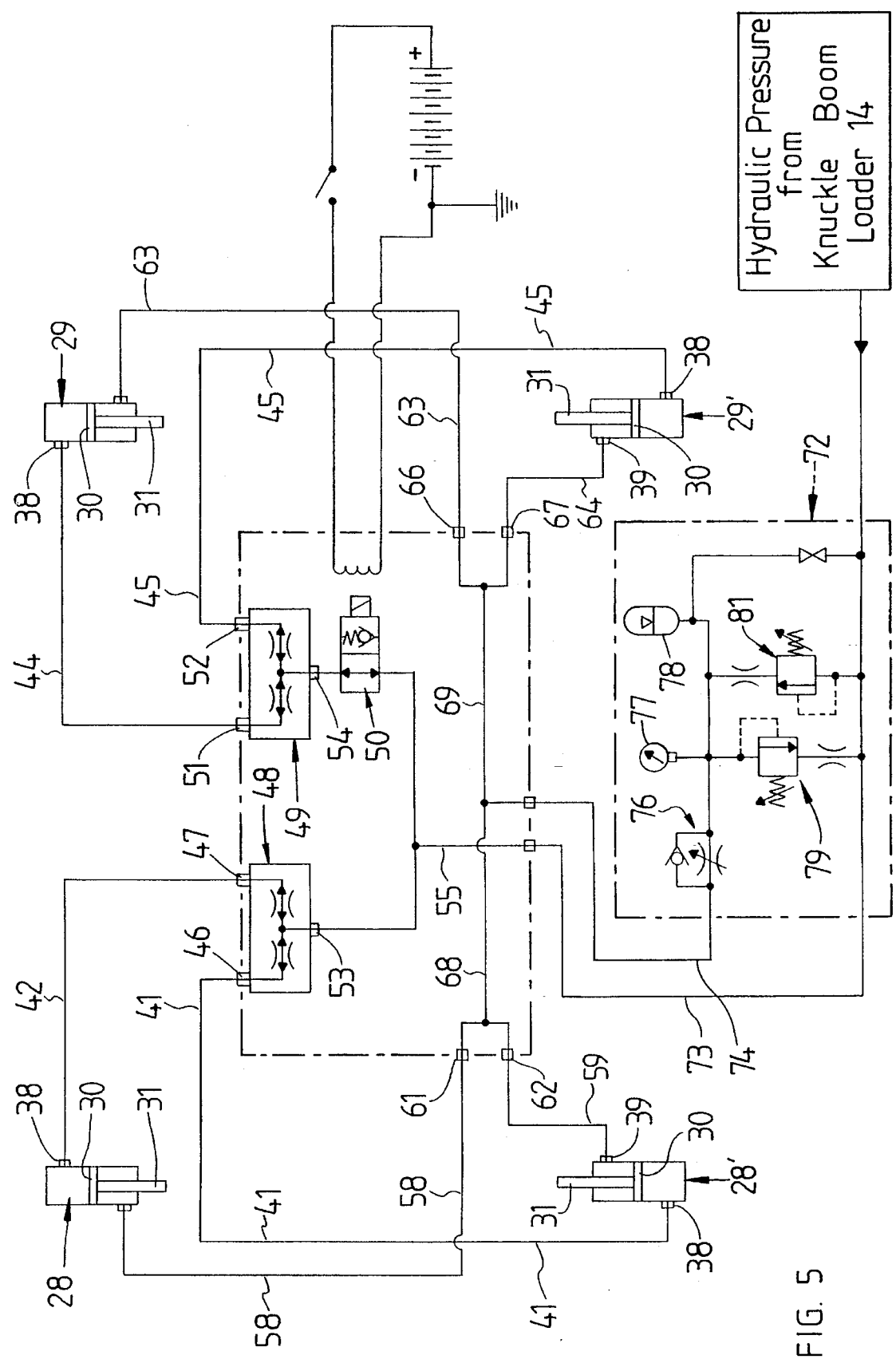

Ports 56 and 71 further connect to a hydraulic accumulator circuit indicated in FIG. 5 by reference numeral 72 and generally known in the art. Port 56 connects through conduit 73 to knuckle boom loader 14. Port 71 connects with conduit 74 through a restriction valve 76 and a gauge 77 to an accumulator 78. A pair of relief valves 79 and 81 connect conduit 73 with conduit 74, as seen in FIG. 5. In operation, the relief valves 79 and 81 maintain a predetermined operating pressure in the hydraulic circuit when the conduit 73 connected to knuckle boom loader 14 is closed.

METHOD OF OPERATION

In operation, an operator located in the knuckle boom loader 14 selects a mode on control valve to open conduit 73. Fluid from knuckle boom loader 14 is forced under pressure through open port 56 on to first ports 53 and 54 of flow divider combiner valves 48 and 49. The fluid passes through flow divider combiner valve 48 and through valve 60 to flow divider combiner valve 49. These flow divider combiner valves 48, 49 equalize the flow of fluid out the second and third ports 46 and 47 with respect to valve 48, as well as out of second and third ports 51 and 52 of flow divider combiner valve 49. The fluid is carried via conduits 41 and 42 to the blind end ports 38 of cylinders 28 and 28'.

This fluid forces the piston 30 to move within cylinders 28, 28', thereby extending the piston rods 31. The piston rods 31 of cylinders 28 and 28' are coupled at one end to the lever arm 32 of sleeve members 22 and 22', as discussed hereinabove. The extension of the piston rods 31 forces the sleeve members 22 and 22' to rotate about shafts 23 and 24, moving the affixed stripping arms 19, 19' to outward positions away from one another. Simultaneously, the fluid is carried via conduits 44 and 45 to the blind end ports 38 of cylinders 29 and 29'. Again, the fluid forces the piston 30 as before, extending piston rods 31. Piston rods 31 are coupled to lever arms 32 for rotating sleeve members 25 and 25'. The affixed guide arms 21, 21' are also rotated to outward positions away from one another. The delimbing apparatus 11 is now in the "open" position for accepting felled trees 13 for delimbing operations.

Should one of the stripping arms 19, 19' or guide arms 21, 21' meet resistance when moving to an outward position, the flow divider combiner valves 48, 49 will allow a greater volume of fluid to pass through the respective ports 46, 47, 51, 52 and conduits 41, 42, 44, 45 of that particular cylinder 28, 28', 29, 29' to allow that piston rod 31 to move at a rate of extension equal to piston rods 31 of the remaining cylinders 28, 28', 29, 29'. Thus, the stripping arms and guide arms 19, 19', 21, 21' all move away from one another to an "open" position. Also, after one of piston rods 31 is fully extended, the flow divider combiner valves pass fluid at equal rates to the remaining cylinders 28, 28', 29, 29' until the remaining piston rods 31 are fully extended as well. This allows the cylinders 28, 28', 29, 29' to resynchronize at the end of this stroke.

Once the arms have all reached their mechanical stops, the hydraulic pressure will begin to rise. When the pressure increases to the pressure setting of the "OPEN" relief valve 81, a pressure differential is created between the upstream and downstream sides of valve 81. The highest pressure is on the upstream side holding the arms open, while the lowest is on the downstream side which is connected to accumulator 78. The accumulator 78 is charged to its recommended pressure, while the arms are thus held open.

After the operator has the trees 13 in place within the delimbing apparatus 11, a control valve on knuckle boom loader 14 is selectively operated to vent conduit 73 to the a reservoir of fluid in the knuckleboom loader which allows fluid from accumulator 78 to flow through conduit 74 and restriction valve 76 to enter port 71. Fluid from port 71 enters conduits 68 and 69. Fluid flows through conduit 68 out ports 61 and 62 of the manifold block 43 and is carried by conduits 58 and 59 to rod end ports 39 of cylinders 28 and 28'. Conduit 69 also carries fluid out ports 66 and 67 of the manifold block 43 through conduits 63 and 64 to the rod end ports 39 of cylinders 29 and 29'.

Fluid enters the rod end ports 39 of cylinders 28, 28', 29 and 29', forcing the piston 30 within the cylinders to withdraw the piston rods 31. As the piston rods 31 are withdrawn, the end connected to lever arm 32 of sleeve members 22, 22', 25, 25' are rotated about shafts 23 and 24 to move each of the affixed stripping arms 19, 19' and guide arms 21, 21' toward one another to an inward position about the felled trees 13. Simultaneously with piston rods 31 being withdrawn, the fluid is forced from the blind end ports 38 of cylinders 28, 28', 29, 29' through conduits 41, 42, 44, and 45 back through second and third ports 46 and 47 of flow divider combiner valve 48 as well as through second and third ports 51 and 52 of flow divider combiner valve 49. During this operation pilot pressure is maintained on the valve 60 to permit backflow to common conduit 55. In the electromechanical version of FIG. 5, the solenoid controlled valve remains in the normal open position to permit back flow. These flow divider combiners valves 48, 49 allow fluid to pass back through at equal rates to insure the rods 31 of cylinders 28, 28', 29, 29' are withdrawn at equal rates of speed. This in turn insures the stripping arms 19, 19' and guide arms 21, 21' move inward about felled tree 13 at the same speed. The cylinders 28, 28', 29, 29' are resynchronized at the end of the stroke which draws inward the piston rods 31. When one of the piston rods 31 is fully withdrawn, the flow divider combiner valves 48, 49 pass equal rates of fluid to the remaining cylinders 28, 28', 29, 29' until the remaining piston rods 31 are fully withdrawn as well, causing the arms to close about the tree. As may be seen, the fluid remaining in the accumulator 78 after closure is released through "CLOSE" relief valve 79 until the pressure in the accumulator 78 is reduced to the valve setting, at which time the valve is closed and the fluid is blocked maintaining the close pressure on all of the cylinders and associated arms.

When a bent trunk tree is encountered, the operator desires to close only the knife arms; therefore, he vents the pilot pressure on valve 60 to the reservoir using valve 99 and the pilot conduit 98. If the device is electromechanical as in FIG. 5, solenoid 101 is electrically actuated to move valve 60' to a closed position. In either embodiment, flow of fluid from the blind end port to the reservoir is blocked. Thus, venting the pressure in conduit 73 as above causes the knife arms to close but has no effect on the guide arms which remain open. If the next tree is not bent, the operator simply hydraulically or electromechanically opens valve 60 and continues with normal operation of the delimber.

While I have shown my invention in various forms, it will be obvious to those skilled in the art that it is not so limited but is susceptible of various changes and modifications without departing from the spirit thereof.

Having set forth the nature of the invention, what is claimed:

1. Apparatus for use with an apparatus for moving a felled tree longitudinally therethrough for delimbing felled trees comprising:
   (a) a plurality of stripping arms and guide arms arranged in pairs in spaced relation, each pair being mounted for pivotal movement about parallel axes such that each arm of said pair moves between a closed position proximal the other arm of said pair and an open position distal the other arm of said pair;
   (b) hydraulic means for selectively moving said arms of said pair to said open and closed positions; and
   (c) means for controlling said hydraulic means such that said guide arms may be selectively maintained in an open position while said stripping arms are moved to a closed position with said felled trees disposed therebetween and maintained in said closed position as said felled trees are urged therethrough.

2. A delimbing apparatus as defined in claim 1 wherein said hydraulic means further comprises:
   (a) a first pair of hydraulic cylinders with slidable pistons disposed therein, said pistons connected to piston rods which are mechanically coupled to said stripping arms, such that linear motion of said piston rods urges said stripping arms about said axes; and
   (b) a second pair of hydraulic cylinders with slidable pistons disposed therein, said pistons connected to piston rods which are mechanically coupled to said guide arms, such that linear motion of said piston rods urges said guide arms about said axes.

3. A delimber apparatus as defined in claim 2, wherein said control means comprises:
   (a) conduit means connecting said a source of pressurized hydraulic fluid and to said first and second pair of hydraulic cylinders;
   (b) selector means operatively associated with said conduit means for selectively connecting said source of pressurized hydraulic fluid to a rod end of said first and second pair of cylinders; and
   (c) valve means for selectively impeding the flow of hydraulic fluid from said second pair of cylinders such that said guide arms are held in an open position while said stripping arms remain operable responsive to said selector means.

4. Apparatus as defined in claim 3 further comprising flow divider means including first and second flow divider combiner valves, each of said flow divider combiner valves having a first port connected to said conduit means for passing the entire flow of hydraulic fluid therethrough, second and third ports for passing a portion of said flow of said hydraulic fluid through said valve, and means for equalizing said flow of said hydraulic fluid through said second and third ports; with said first ports of said first and second flow divider combined valves connected in parallel via said conduit means, said second and third ports thereof connected to said pairs of hydraulic cylinders at blind end ports thereof via said conduit means such that the flow of said hydraulic fluid at each blind end of each of said cylinders is controlled to insure equal extension of each piston of each cylinder in said pair of hydraulic cylinders.

5. Apparatus as described in claim 2, wherein said control means comprises a valve operably connected between said second pair of cylinders and a source of pressurized hydraulic fluid, said valve being selectively operable in an open position allowing free flow of hydraulic fluid between said source and said pair of cylinders, and a closed position preventing flow of hydraulic fluid between said pair of cylinders and said source.

6. Apparatus as defined in claim 5, wherein said valve is a hydraulically actuated valve operably connected to said source.

7. Apparatus as defined in claim 5, wherein said valve is an electrically actuated valve operably connected for operation from a remote location.

8. Apparatus as described in claim 4, wherein said conduit means comprises a first common conduit connected between said selector means and said flow divider combiner valves, a second common conduit connected between said selector means and said pairs of hydraulic cylinders.

9. Apparatus for delimbing felled trees, comprising:
   (a) a pair of stripping arms and a pair of guide arms arranged in spaced relation along a longitudinal axis and mounted to a common pivotal frame for concomitant movement therewith responsive to the movement of a tree substantially along said axis, each pair being mounted for pivotal movement about parallel axes such that each arm of said pair moves between a closed position proximal the other arm of said pair and an open position distal the other arm of said pair;
   (b) hydraulic means for selectively moving said arms of said pair to said open and closed positions; and
   (c) valve means for controlling said hydraulic means such that said guide arms may be selectively maintained in an open position while said stripping arms are moved to a closed position as a tree is moved therethrough such that deviations of said tree from said longitudinal axis are accommodated by movement of said frame without binding of said tree between said guide arms and said stripping arms.

10. A delimbing apparatus as defined in claim 9, wherein said hydraulic means further comprises:
    (a) a first pair of hydraulic cylinders with slidable pistons disposed therein, said pistons connected to piston rods which are mechanically coupled to said stripping arms, such that linear motion of said piston rods urges said stripping arms about said axes;
    (b) a second pair of hydraulic cylinders with slidable pistons disposed therein, said pistons connected to piston rods which are mechanically coupled to said guide arms, such that linear motion of said piston rods urges said guide arms about said axes.

11. Apparatus as defined in claim 10, wherein said valve means is a hydraulically actuated valve operably connected between said second pair of hydraulic cylinders and a source of pressurized fluid.

12. Apparatus as defined in claim 10, wherein said valve means is an electrically actuated valve operably connected for operation from a remote location to control the flow of hydraulic fluid between said second set of hydraulic cylinders and a source of pressurized fluid.

13. An improvement to an apparatus for delimbing trees including means for urging felled trees substantially along a longitudinal axis, a pair of stripping arms and a pair of guide arms commonly supported on a pivotally mounted frame in spaced relation along said longitudinal axis, each pair being mounted for pivotal movement about parallel axes such that each arm of said pair moves between a closed position proximal the other arm of said pair and an open position distal the other arm of said pair, comprising in combination therewith:
    a) means for selectively moving said arms of said pairs to said open and closed positions including first hydraulic actuators operably connected to said guide arms and second hydraulic actuators operably connected to said stripping arms;
    (b) conduit means connecting said first and second hydraulic actuators to a source of pressurized hydraulic fluid;
    (c) selector means for selectively connecting said source of pressurized hydraulic fluid to said first and second hydraulic actuators; and
    (d) valve means for selectively impeding the flow of hydraulic fluid to and from said first hydraulic actuators such that said guide arms are held in an open position, disengaged from said tree, and said stripping arms are held in a closed position as a tree is urged along said longitudinal axis.

* * * * *